US 6,664,890 B2

(12) United States Patent
Yamagiwa et al.

(10) Patent No.: US 6,664,890 B2
(45) Date of Patent: Dec. 16, 2003

(54) AIR PRESSURE DETECTION DEVICE FOR TIRE

(75) Inventors: Toshio Yamagiwa, Saitama (JP); Tomoyuki Harada, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/058,277

(22) Filed: Jan. 30, 2002

(65) Prior Publication Data
US 2002/0105420 A1 Aug. 8, 2002

(30) Foreign Application Priority Data
Jan. 30, 2001 (JP) ......................... 2001-022336

(51) Int. Cl.⁷ .................. B60C 23/00; B60C 23/02
(52) U.S. Cl. ............... 340/442; 340/445; 340/446; 340/447; 340/448; 340/427; 340/425.5; 73/146.2; 73/146.5
(58) Field of Search .................. 340/442, 445–448, 340/427, 425.5; 73/146.5, 146.2

(56) References Cited

U.S. PATENT DOCUMENTS

| 4,909,074 A | * | 3/1990 | Gerresheim et al. | ....... 73/146.4 |
| 5,895,846 A | * | 4/1999 | Chamussy et al. | ......... 73/146.2 |
| 5,900,809 A | * | 5/1999 | Hebert | ....................... 340/442 |
| 5,963,128 A | * | 10/1999 | McClelland | ................ 340/447 |
| 6,450,021 B1 | * | 9/2002 | Katou et al. | ................ 73/146.5 |

FOREIGN PATENT DOCUMENTS

JP          10-44726        2/1998

* cited by examiner

Primary Examiner—Benjamin C. Lee
Assistant Examiner—Lam Pham
(74) Attorney, Agent, or Firm—Birch, Stewart, Kolasch & Birch, LLP

(57) ABSTRACT

A vehicle is provided with an air pressure detection device for a tire which includes a temperature sensor for measuring the temperature of a tire and an air pressure sensor for measuring the air pressure of the tire. A reduced air pressure arithmetic portion is provided for calculating a reduced air pressure Pm from the temperature Tx measured by the temperature sensor and the air pressure Px measured by the air pressure sensor by the formula set forth below. An alarm signal generating portion is provided for generating an alarm signal when the reduced air pressure Pm calculated by the reduced air pressure arithmetic portion is decreased to or below a first threshold value Pa.

$$Pm = Px - K(Tx - T0)$$

The condition where the tire air pressure is lowered to or below a threshold value determined based on a recommended air pressure can be accurately detected, and an alarm can be issued, without being affected by tire temperature rise or temperature variations.

12 Claims, 7 Drawing Sheets

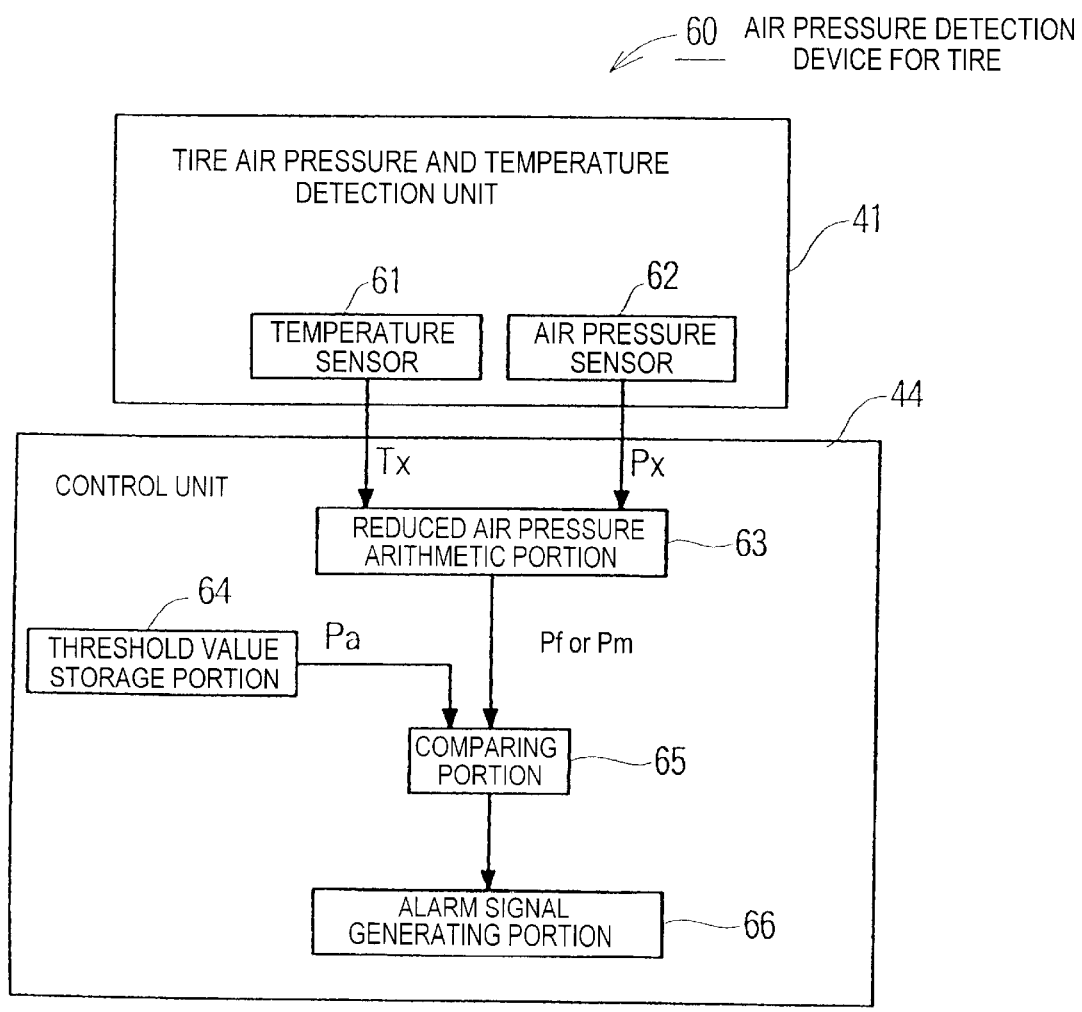

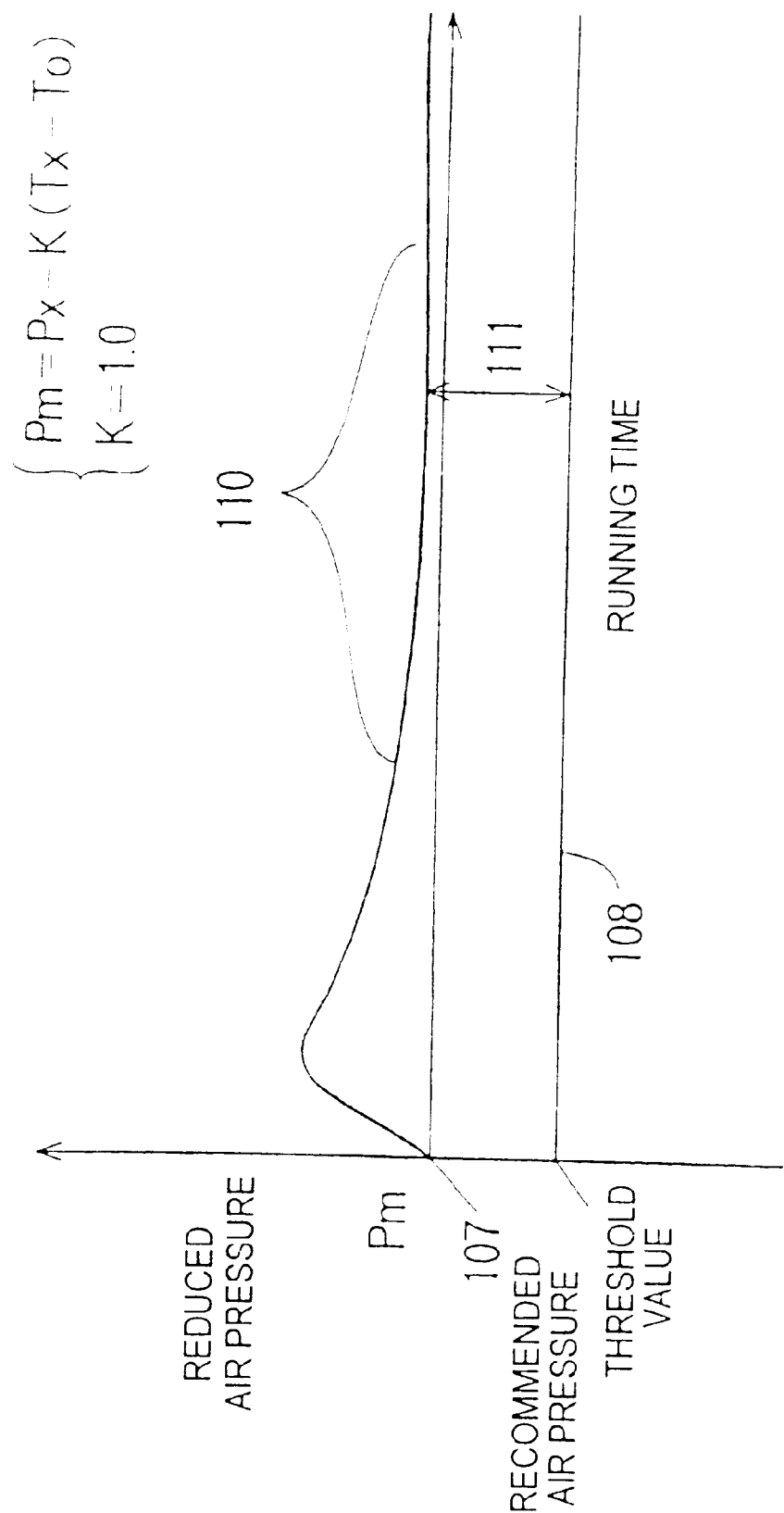

AIR PRESSURE DETECTION DEVICE FOR TIRE

CROSS-REFERENCE TO RELATED APPLICATIONS

The present application claims priority under 35 USC 119 to Japanese Patent Application No. 2001-022336 filed on Jan. 30, 2001 the entire contents thereof is hereby incorporated by reference.

BACKGROUND OF THE INVENTION

1. Field of the Invention

The present invention relates to an air pressure detection device for tire which takes into account the temperature at a predetermined portion inside a tire. More specifically, to an air temperature in an air chamber inside the tire or the temperature of a tread portion, a carcass portion or a shoulder portion or the like of the tire.

2. Description of Background Art

A tire air pressure alarm device for measuring the air pressure of a tire and informing the driver of the air pressure even during operation of the vehicle is known, for example, as set forth in Japanese Patent Laid-open No. Hei 10-44726, entitled "Tire Air Pressure Alarm Device." As set forth in FIG. 1, Japanese Patent Laid-open No. Hei 10-44726, a tire air pressure alarm device is disclosed in which a valve stem 10 (symbols used in the publication are used here) is fitted to a wheel rim 1. A case 2 is disposed at a lower portion of the valve stem 10. A transmission unit 7 includes a pressure detecting portion 3, a signal processing circuit 4 and an electric cell 5 contained in the case 2. In this device, the value of the pressure directly detected by the pressure detecting portion 3 is subjected to signal processing and the processed signal is transmitted to a reception unit.

The temperature of a tire and the temperature of air in an air chamber inside the tire are raised due to friction with the road surface or the like according to the operating conditions. Attendant on the temperature rise, the air pressure in the air chamber inside the tire is also raised. Therefore, since the air pressure influenced by temperature is detected in the above-mentioned invention, it has been difficult to judge whether the tire air pressure during running is maintained at a recommended air pressure.

SUMMARY AND OBJECTS OF THE INVENTION

Accordingly, it is an object of the present invention to provide an air pressure detection device for tire which takes temperature variation into account.

In order to attain the above object, an air pressure detection device for a tire includes an air pressure sensor for measuring the air pressure of a tire, a temperature sensor for measuring the temperature at a predetermined portion inside the tire, a reduced air pressure arithmetic means for calculating a reduced air pressure from the air pressure measured by the air pressure sensor and the temperature measured by the temperature sensor, and an alarm signal generating means for generating an alarm signal when the reduced air pressure calculated by the reduced air pressure arithmetic means is lowered to or below a predetermined first threshold value.

The temperature at a predetermined portion inside the tire means the temperature of air in the air chamber inside the tire or the temperature of the tire itself at a tread portion, a carcass portion, a shoulder portion or the like or a similar in-tire temperature. In judging whether the air pressure of a tire is maintained at a recommended air pressure, it is effective to take into account the temperature at a predetermined portion inside the tire.

From this point of view, the air pressure of the tire is measured, and, at the same time, the temperature at a predetermined portion inside the tire is measured, then a reduced air pressure is calculated, and an alarm signal is generated based on the reduced air pressure. Therefore, it is possible to know the air pressure affected little by temperature, and to generate an alarm with high accuracy.

The present invention is directed to a reduced air pressure Pm calculated by the reduced air pressure arithmetic means is calculated by the following formula:

$$Pm = Px - K(Tx - T0)$$

where $Px$ is the air pressure of the tire measured by the air pressure sensor, $Tx$ is the temperature at the predetermined portion inside the tire measured by the temperature sensor, $T0$ is a recommended temperature corresponding to a recommended air pressure for the tire, and $K$ is a predetermined constant.

The reduction or conversion of air pressure taking temperature into account can be performed according to Boyle-Charles' formula which states that (absolute pressure)/(absolute temperature) is constant. However, as will be described in detail, it has been found that this conversion produces a large error.

In view of this, the reduced air pressure is determined by the formula: $Px - K(Tx - T0)$. As a result, the error becomes minute, and it is made possible to monitor the air pressure more accurately.

In the present invention, the alarm signal generating means generates an alarm signal when the decrease per unit time of the air pressure of the tire measured by the air pressure sensor is decreased below a predetermined second threshold value.

Since the alarm signal is generated when the decrease per unit time of the air pressure of the tire measured by the air pressure sensor is decreased below the predetermined second threshold value, it is possible to swiftly detect leakage of air from the tire and to generate an alarm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a block diagram of the air pressure detection device for a tire according to the present invention;

FIG. 7 is a graph of reduced air pressure obtained by an empirical conversion formula according to the present invention.

DETAILED DESCRIPTION OF THE PREFERRED EMBODIMENTS

Figure 1:
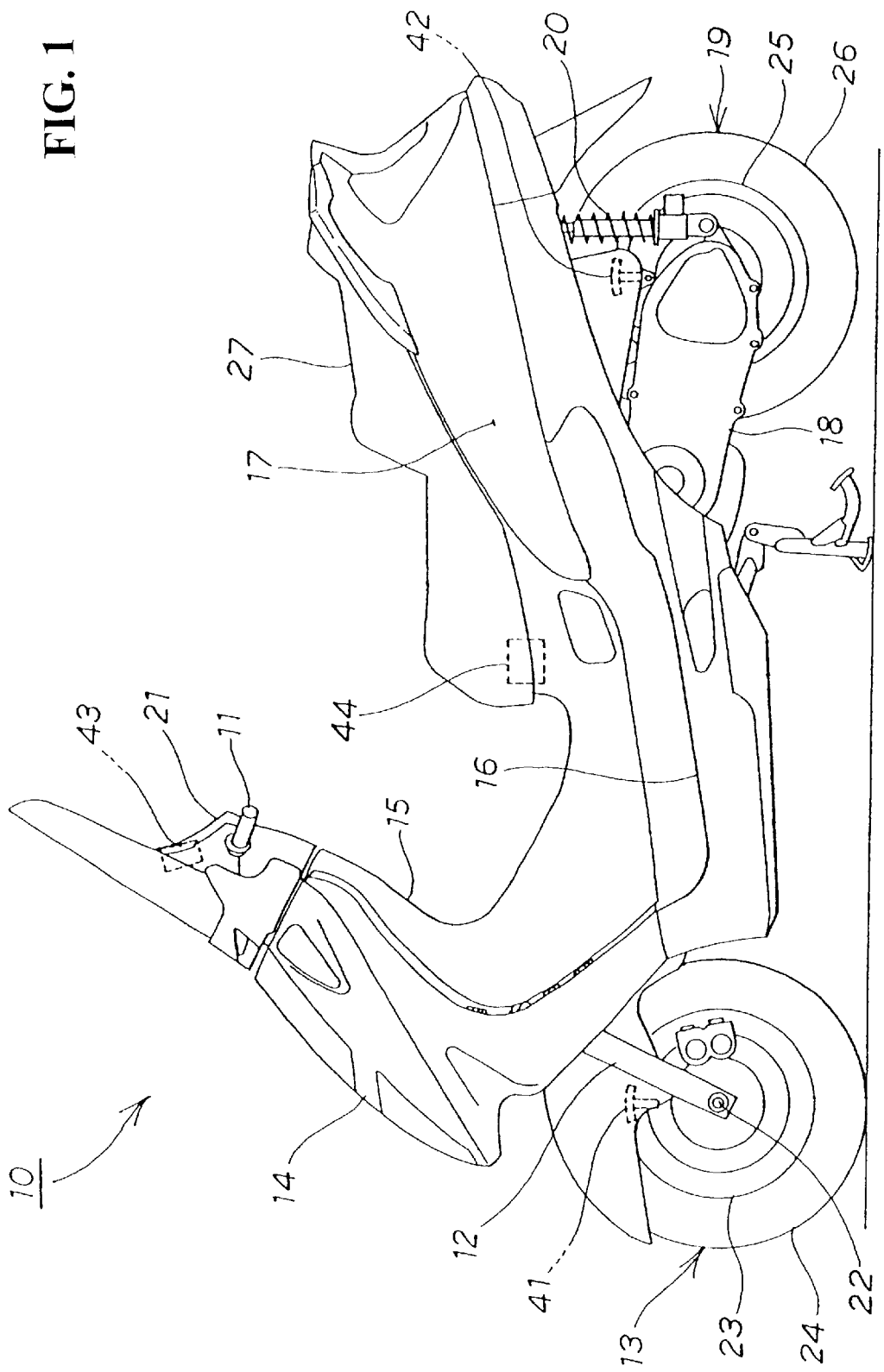
FIG. 1 is a side view of a motorcycle provided with an air pressure detection device for a tire according to the present invention.

An embodiment of the present invention will be described below based on the attached drawings. FIG. 1 is a side view of a motorcycle provided with an air pressure detection device for a tire according to the present invention. The motorcycle 10 includes a handle 11, a front fork 12 and a front vehicle wheel 13 steerably fitted to a lower portion of the handle 11. A front cover 14 and a front inner cover 15 are provided for covering a lower portion of the handle 11 and an upper portion of the front fork 12. A floor step 16 is disposed on the lower rear side of the front cover 14. A body cover 17 is connected with a rear upper portion of the floor step 16. A power unit 18 extends rearwardly from the inside of the body cover 17. A rear vehicle wheel 19 is fitted to a rear portion of the power unit 18. An air suspension device 20 spans between a rear end portion of the power unit 18 and a vehicle body frame (not shown) inside the body cover 17. A meter panel 21 is fitted to the handle 11. An axle 22, a wheel 23 and a tire 24 form the front vehicle wheel 13. A wheel 25 and a tire 26 form the rear vehicle wheel 19. A seat 27 is connected to the motorcycle 10.

Further, the motorcycle 10 is provided with an air pressure detection device which includes an air pressure and temperature detection unit 41 incorporated in the front vehicle wheel 13. An air pressure and temperature detection unit 42 is incorporated in the rear vehicle wheel 19. A display unit 43 is provided at a meter panel 21, and a control unit 44 disposed, for example, on the lower side of a seat 27. Detailed descriptions thereof are described later.

Figure 2:
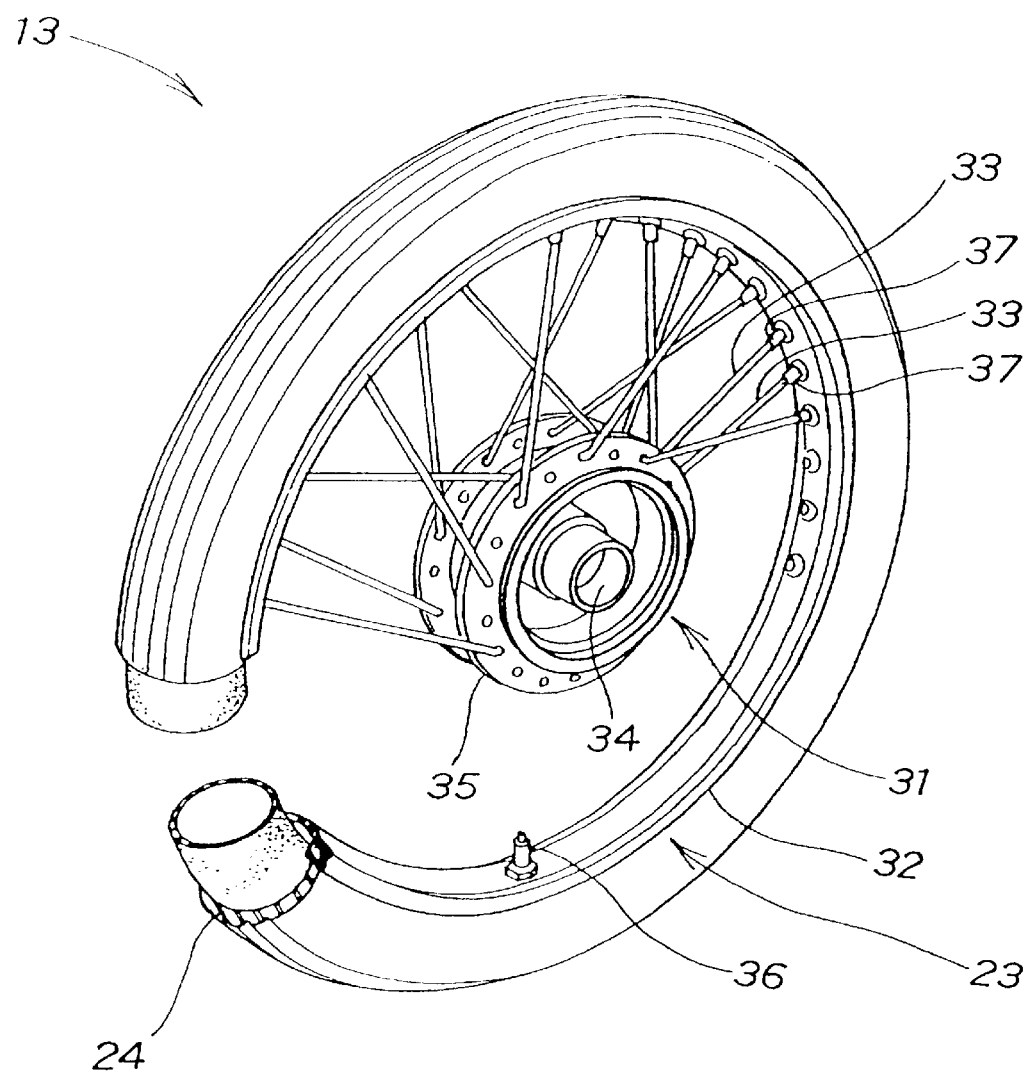
FIG. 2 is a perspective view of a vehicle wheel.

FIG. 2 is a perspective view of a vehicle wheel. The structure of a wheel 23 to which the tire air pressure and temperature detection unit is fitted will be described. The wheel 23 includes a hub 31 rotatably fitted to the axle 22, a rim 32 to which a tire 24 is fitted, and a plurality of spokes 33 . . . ( . . . means plurality, here and hereinafter) connecting between the rim 32 and the hub 31. The hub 31 includes a bearing portion 34 fitted to the axle 22 through a bearing (not shown), and disk portions 35 . . . onto which the plurality of spokes 33 . . . are hooked, whereas the rim 32 includes a tire valve 36 for injecting air into the tire 24. The spoke 33 has one end hooked onto the disk portion 35 of the hub 31 and the other end fitted to the rim 32 through a nipple 37, whereby the rim 32 and the hub 31 are integrally connected. The rear vehicle wheel 19 shown in FIG. 1 has substantially the same constitution as that of the front vehicle wheel 13, and detailed description thereof is omitted.

Figure 3:
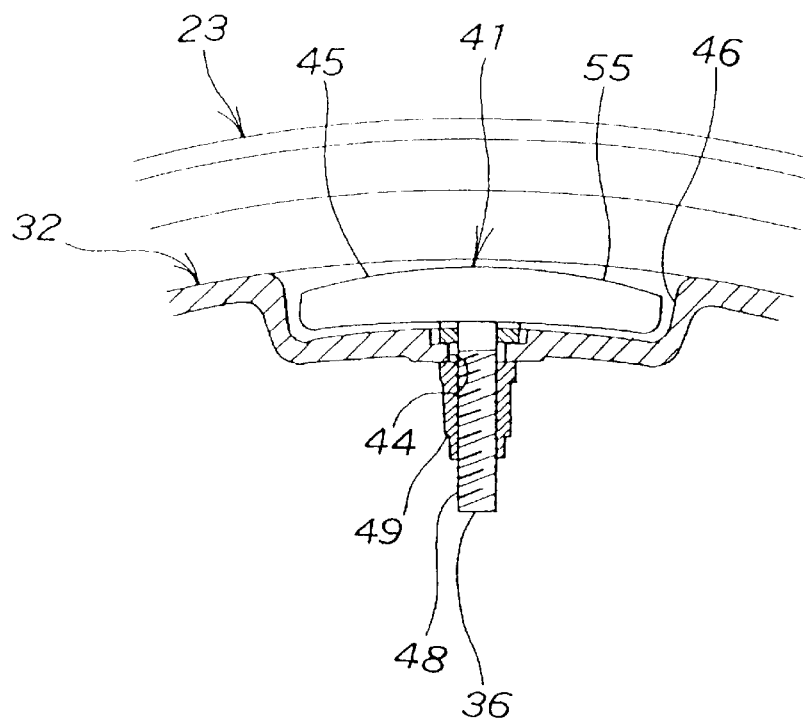
FIG. 3 is a sectional view of a tire air pressure and temperature detection unit according to the present invention.

FIG. 3 is a sectional view of a tire air pressure and temperature detection unit according to the present invention. The tire air pressure and temperature detection unit 41 for the front vehicle wheel includes an air pressure and temperature detection unit main body 45 provided with an air pressure sensor and a temperature sensor. A tire valve 36 is fitted to the air pressure and temperature detection unit main body 45 so as to be opened only when supplying air into the tire 24 (See FIG. 1) and to normally be closed so that the air supplied into the tire 24 does not leak to the exterior. The air pressure and temperature detection unit main body 45 is disposed in a recessed portion 46 provided at a bottom of the rim 32, the tire valve 36 is inserted into a valve insertion hole 47 provided at the bottom of the rim 32, and a nut 49 is fastened onto a male screw portion 48 provided at an outer peripheral surface of the tire valve 36, whereby the tire air pressure and temperature detection unit 41 is fitted to the wheel 23. A tire air pressure and temperature detection unit 42 (See FIG. 1) for the rear vehicle wheel is the same as the tire air pressure and temperature detection unit 41 for the front vehicle wheel, so that description of the structure thereof is omitted.

Figure 4:
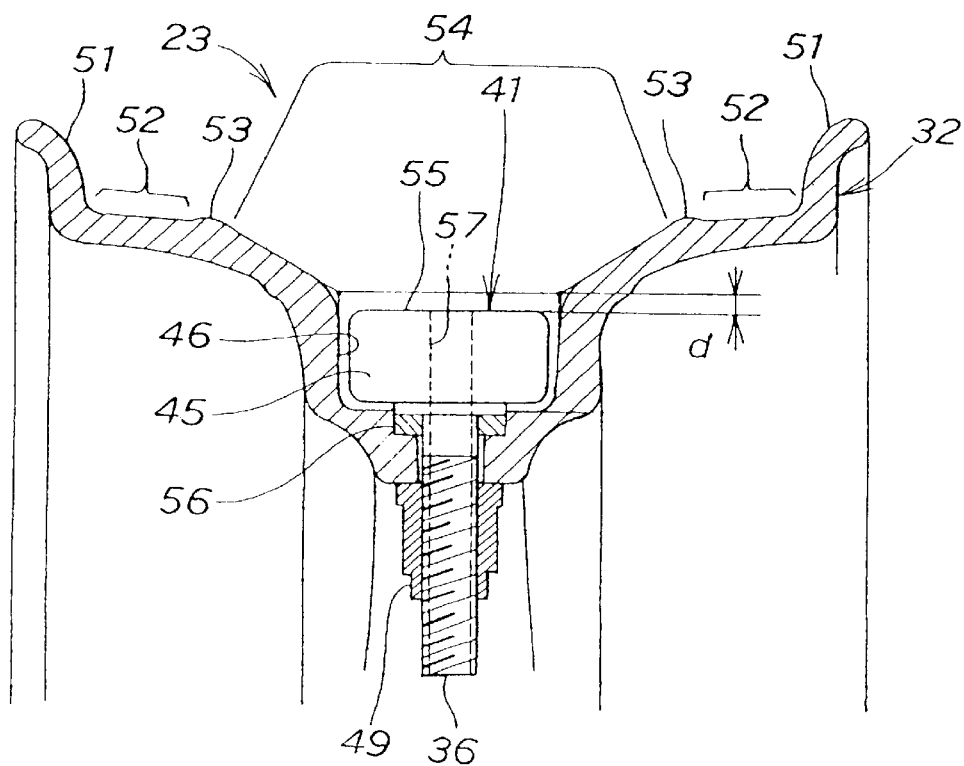
FIG. 4 is a sectional view of a wheel and the tire air pressure and temperature detection unit according to the present invention.

FIG. 4 is a sectional view of the wheel and the tire air pressure and temperature detection unit according to the present invention. The wheel 23 includes flange portions 51, 51, bead seat portions 52, 52 provided on the inside of the flange portions 51, 51, hump portions 53, 53 made to protrude on the inside of the bead seat portions 52, 52, a rim drop portion 54 recessed between the hump portions 53, 53, and the above-mentioned recessed portion 46 provided at the rim drop portion 54.

The bead seat portion 52 is a portion for retaining a bead portion of the tire 24 (See FIG. 1). The hump portion 53 is an annular projecting portion for preventing the tire 24 from slipping off from the bead seat portion 52 of the wheel 23. The rim drop portion 54 is dropped deeply so as to facilitate the fitting and detaching of the tire 24.

The tire air pressure and temperature detection unit 41 is fitted to the rim 32 so that an outside surface 55 of the air pressure and temperature detection unit main body 45 is disposed on the inner side by a distance "d" relative to a bottom surface of the rim drop portion 54. A seal member 56 is provided for preventing air from leaking from the air chamber inside the tire 24 to the exterior. A communication hole 57 (shut off by a valve body not shown) is provided in the tire valve 36 for communication between the interior and the exterior of the tire 24.

As has been described referring to FIGS. 3 and 4, the air pressure and temperature detection unit main body 45 is contained in the recessed portion 46 of the rim 32, and the air pressure and temperature of the tire are measured by the tire air pressure and temperature detection unit 41 fitted to the wheel. In the air pressure detection device for a tire according to the present invention, the fitting of the air pressure and temperature detection unit main body is not limited to the above-described constitution, and is not limited by the presence or absence of the tire tube.

FIG. 5 is a block diagram of the air pressure detection device for a tire according to the present invention. The air pressure detection device 60 for a tire includes the tire air pressure and temperature detection unit 41 including a temperature sensor 61 for measuring the temperature Tx of the tire 24 (See FIG. 2) and an air pressure sensor 62 for measuring the air pressure Px of the tire. A control unit 44 includes a reduced air pressure arithmetic portion 63 for calculating a reduced air pressure based on the temperature Tx and the pressure Px of the tire, a threshold value storage portion 64 for setting a threshold value based on a recommended air pressure, a comparing portion 65 for comparing the reduced air pressure and the threshold value, and an alarm signal generating portion 66 for generating an alarm signal when it is found by the comparison that the reduced air pressure is equal to or lower than the threshold value.

The operation of the air pressure detection device 60 constituted as above will be described. The temperature Tx of the tire measured by the temperature sensor 61 and the air pressure Px measured by the air pressure sensor 62 are fed to the control unit 44. The reduced air pressure arithmetic portion 63 receiving the temperature Tx and the air pressure Px calculates a reduced air pressure Pf or Pm based on the air pressure Px and the temperature Tx and using a predetermined conversion formula (specific example of the formula will be described later). The reduced air pressure Pf or Pm thus calculated is inputted to the comparing portion 65. On the other hand, a first threshold value Pa corresponding to a recommended air pressure is preliminarily stored in the threshold value storage portion 64. The reduced air pressure Pf or Pm and the first threshold value Pa are compared with each other by the comparing portion 65. When the first threshold value Pa exceeds the reduced air pressure Pf or Pm, the information is sent to the alarm signal generating portion 66. The alarm signal generating portion 66 generates an alarm signal. Here, the recommended air pressure means an air pressure of a tire recommended so as to obtain a normal operation of the vehicle. This corresponds to the air pressure of the tire measured at normal temperature (25° C.). The data transmission of the temperature Tx and the air pressure Px from the tire air pressure and temperature detection unit 41 to the control unit 44 is carried out by a transmission unit and a reception unit which are not shown.

Incidentally, the alarm is generated also when the signal from the transmission unit for transmitting the signal from the temperature sensor 61 or the air pressure sensor 62 can not be received by the reception unit for some reason.

Figure 6A:
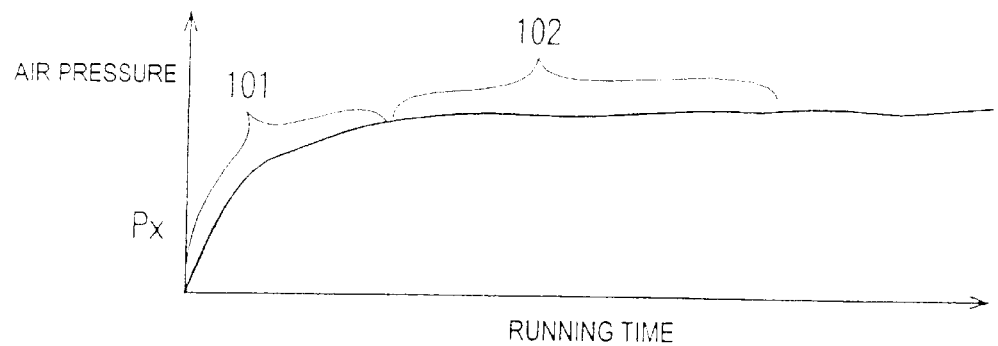
FIGS. 6(a) to (c) are graphs showing the measured air pressure, measured in-tire air temperature and reduced air pressure.
Figure 6B:
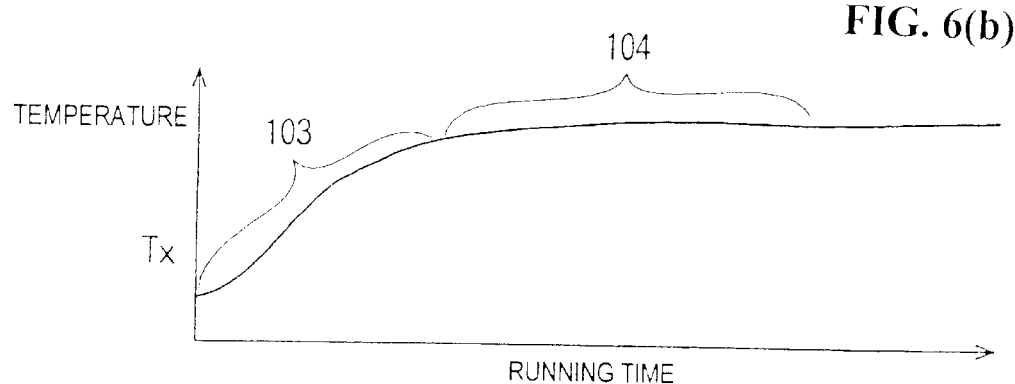
Figure 6C:
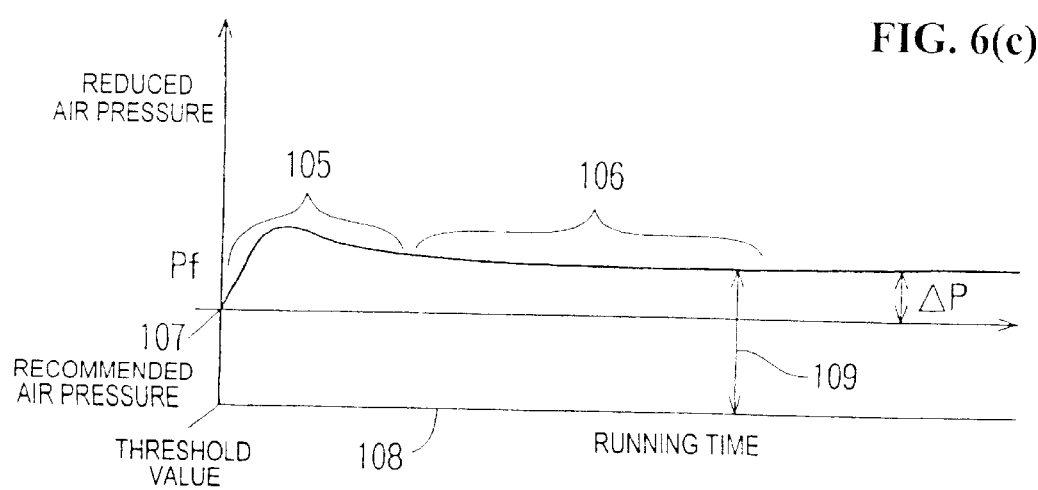

FIGS. 6(a) to 6(c) are graphs showing the measured air pressure, measured in-tire air temperature and the reduced air pressure.

In FIG. 6(a), the axis of the abscissa is operating time, and the axis of the ordinate is the measured air pressure (gauge pressure) Px; the pressure sharply increased in an initial region 101, and then was substantially stabilized in a region 102.

In FIG. 6(b), the axis of abscissa is running time, and the axis of ordinate is the measured in-tire air temperature (° C.) Tx; the temperature sharply increased in an initial region 103, and then was substantially stabilized in a region 104.

In the region 104, the heat generated at the tire (input heat) and the heat radiated from the tire (output heat) are balanced with each other. As a result, the region 102 in FIG. 6(a) also is thought to be stabilized.

In FIG. 6(c), the axis of the abscissa is operating time, and the axis of the ordinate is the reduced air pressure (gauge pressure) Pf.

According to Boyle-Charles' formula, (absolute pressure)/(absolute temperature) is constant if the volume is universal. The following conversion formulas are given:

$(Px + \text{atmospheric pressure})/(Tx+273) = Pf + \text{atmospheric pressure}/(25+273)$ $Pf = (Px + \text{atmospheric pressure}) \cdot (25+273)/(Tx+273) - \text{atmospheric pressure}$ where Px is the measured air pressure, Tx is the measured in-tire air temperature, normal temperature is 25° C. and Pf is the air pressure reduced to normal temperature.

When Px in the above formulas is substituted with the value of FIG. 6(a) and Tx is substituted with the value of FIG. 6(b), Pf is determined, and a graph representing this is the curve in FIG. 6(c).

The region 106 of the curve in FIG. 6(c) is substantially constant, which shows the effect of correction of pressure according to temperature. When the air pressure of tire at the start of operation is set as the recommended air pressure 107 and a value obtained by multiplying the recommended air pressure 107 by a value of 0.4 to 0.6 is set as the threshold value 108, it is possible to judge that the air pressure of the tire is normal when the curve is on the upper side of the threshold value 108 and that the air pressure of the tire is abnormal when the curve is on the lower side of the threshold value 108.

Incidentally, since the reduced air pressure Pf is a pressure corrected by temperature, at least the curve in the region 106 must return to the recommended air pressure 107. However, as a result of experiments, it has been found that there is an upward offset of P. Therefore, the difference 109 between the curve and the threshold value 108 is increased, and it is difficult for the reduced air pressure Pf to come below the threshold value 108. From the viewpoint of accurate detection of an abnormal condition, it is preferable that the difference P is smaller.

In view of the above, the present inventor paid attention to the fact that the region 102 in FIG. 6(a) and the region 104 in FIG. 6(b) are substantially constant. Namely, the correction using the absolute pressure and the absolute temperature is effective in the case of large variations of temperature, but it is needless where the temperature is substantially constant. Thus, again paying attention to FIG. 6(a) and FIG. 6(b), it is seen that the region 104 in FIG. 6(b) shows a slightly upward variation, and the region 102 in FIG. 6(a) follows up to this tendency. If so, it can be judged that correction of the pressure by a factor of temperature is effective. The factor of temperature is set to be Tx−T0, where Tx is the measured temperature, and T0 is normal temperature. As a result, there is obtained an empirical formula: $Pm = Px - (Tx - T0)$. Here, since it is necessary to a the tire and running conditions, Tx−T0 is multiplied by a coefficient K. The empirical conversion formula thus obtained is $Pm = Px - K(Tx - T0)$.

FIG. 7 is a graph of the reduced air pressure obtained by the empirical conversion formula according to the present invention; in the formula $Pm = Px - K(Tx - T0)$, K=1.0 is used, and the formula is substituted with Px of FIG. 6(a) and Tx of FIG. 6(b) to calculate Pm, and the result is represented by the graph. It is seen that Pm is sufficiently approximate to the recommended air pressure 107 in a region 110. By this, detection of normal/abnormal condition of the pressure can be accurately carried out based on the difference 111.

While the above embodiment has been investigated on the presumption of gradual pressure change, there may be a case where the air pressure of the tire abruptly decreases due to treading on a metallic piece (nail or the like) on the road. To detect such an abrupt pressure decrease is useful, and a function of detecting in such a case will be described below.

Figure 8:
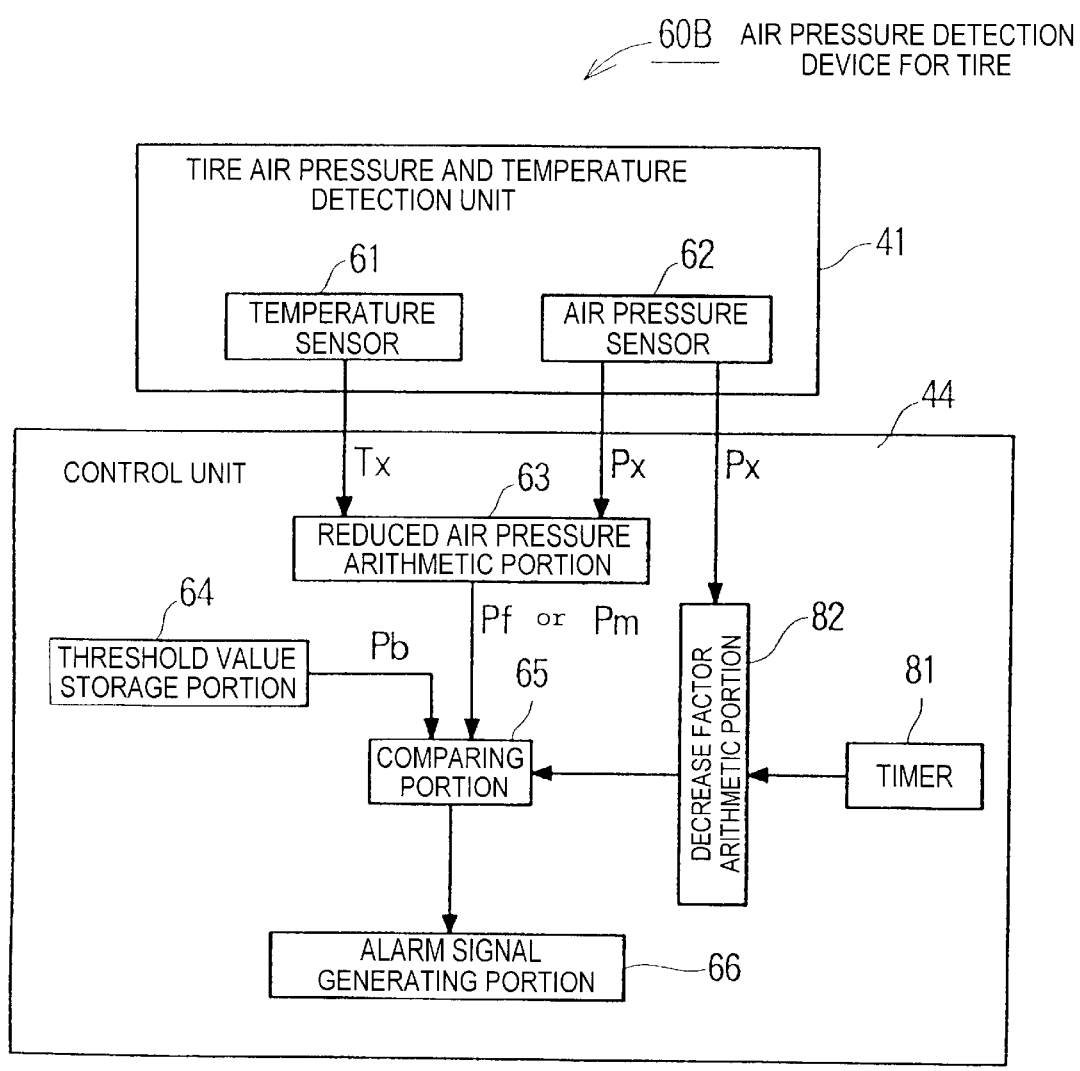
FIG. 8 is a block diagram of an air pressure detection device for a tire according to another embodiment of the present invention.

FIG. 8 is a block diagram of an air pressure detection device for a tire according to another embodiment of FIG. 5. The same blocks as those in the air pressure detection device 60 for a tire in FIG. 5 are denoted by the same symbols, and detailed description thereof is omitted.

The air pressure detection device 60B for a tire includes a timer 81, and a decrease factor arithmetic portion 82 for calculating the decrease of air pressure of tire per unit time (for example, 5 sec, 10 sec, 30 sec or the like) set by the timer 81.

In the air pressure detection device 60B for a tire, simultaneously with the comparison of the first threshold value Pa and the reduced air pressure Pm carried out by the air pressure detection device 60 for a tire of FIG. 5, the decrease factor arithmetic portion 82 calculates the decrease per unit time of the tire air pressure Px measured directly by an air pressure sensor 62, and the decrease factor of the tire air pressure and a second threshold value Pb set in a threshold value storage portion are compared with each other. An alarm signal generating portion 66 generates an alarm based on the results of the comparison.

Therefore, in the air pressure detection device 60B for a tire, an alarm signal can be accurately generated based on the reduced air pressure Pm and independently of the tire temperature Tx. At the same time, air leakage from the tire is swiftly detected from the decrease factor of the tire air pressure Tx directly measured by the air pressure sensor 62, whereby an alarm signal can be generated. While the vehicle has been described as the motorcycle 10 as shown in FIG. 1 in the embodiment, the vehicle is not limited to a motorcycle, and may be a four-wheel or three-wheel vehicle.

The present invention provides a temperature sensor for measuring the temperature of a tire and an air pressure sensor for measuring the air pressure of the tire. A reduced air pressure arithmetic portion is provided for performing arithmetic operation based on the temperature and air pressure measured by the sensors. The reduced air pressure calculated by the reduced air pressure arithmetic portion is compared with a threshold value. An alarm is generated, so that the decrease in the tire air pressure to or below a threshold value determined based on a recommended air pressure can be accurately detected and an alarm can be issued, without being affected by tire temperature rise or temperature variations.

In addition, if the present invention is used an air pressure approximate to the recommended air pressure can be obtained, as compared with an air pressure reduced by use of a state equation. The present invention permits the generation of an alarm with good accuracy.

Further, the present invention provides an alarm that is generated when the decrease per unit time of the tire air pressure is decreased beyond a predetermined threshold value, so that it is possible to swiftly respond to air leakage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detection device for a tire comprising:
   an air pressure sensor for measuring the air pressure of a said tire;
   a temperature sensor for measuring the temperature at a predetermined portion in said tire;
   a reduced air pressure arithmetic means for calculating a reduced air pressure Pm from the air pressure measured by said air pressure sensor and the temperature measured by said temperature sensor, the reduced air pressure Pm being calculated by the following formula:

$$Pm=Px-K(Tx-T0)$$

where Px is the air pressure of said tire measured by said air pressure sensor, Tx is a temperature at said predetermined portion in said tire measured by said temperature sensor, T0 is a recommended temperature corresponding to a recommended air pressure of said tire, and K is a predetermined constant; and
   an alarm signal generating means for generating an alarm signal when the reduced air pressure calculated by said reduced air pressure arithmetic means is lowered to or below a predetermined first threshold value.

2. The air pressure detection device for a tire as set forth in claim 1, wherein said alarm signal generating means generates said alarm signal when a decrease of the air pressure of said tire over a unit time measured by said air pressure sensor is decreased below a predetermined second threshold value.

3. The air pressure detection device for a tire as set forth in claim 2, and further including a timer for timing the intervals of the decrease in the air pressure over said unit time.

4. The air pressure detection device for a tire as set forth in claim 1, and further including a comparing means for comparing the reduced air pressure from said reduced air pressure arithmetic means and said predetermined first threshold value.

5. The air pressure detection device for a tire as set forth in claim 4, and further including a threshold value storage means for storing a plurality of threshold values commensurate with a plurality of tires and tire conditions.

6. The air pressure detection device for a tire as set forth in claim 5, wherein the reduced air pressure arithmetic means, the threshold value storage means, the comparing means and the alarm signal generating means form a control unit for receiving air pressure and temperature from a tire.

7. An air pressure detection device for a tire comprising:
   an air pressure sensor for measuring air pressure of said tire;
   a temperature sensor for measuring temperature of said tire;
   means for calculating a reduced/increased air pressure Pm as compared to the air pressure measured by said air pressure sensor and a reduced/increased temperature measured by said temperature sensor, the reduced air pressure Pm being calculated by the following formula:

$$Pm=Px-K(Tx-T0)$$

where Px is the air pressure of said tire measured by said air pressure sensor, Tx is a temperature at said predetermined portion in said tire measured by said temperature sensor, T0 is a recommended temperature corresponding to a recommended air pressure of said tire, and K is a predetermined constant; and
   an alarm signal generating means for generating an alarm signal when the reduced/increased air pressure calculated by said means for calculating a said reduced/increased air pressure is lowered/higher a predetermined first threshold value.

8. The air pressure detection device for a tire as set forth in claim 7, wherein said alarm signal generating means generates said alarm signal when a decrease of the air pressure of said tire over a time unit measured by said air pressure sensor is decreased below a predetermined second threshold value.

9. The air pressure detection device for a tire as set forth in claim 8, and further including a timer for timing the intervals of the decrease in the air pressure over said unit time.

10. The air pressure detection device for a tire as set forth in claim 7, and further including a comparing means for comparing the reduced air pressure from said means for calculating a reduced/increased air pressure and said predetermined first threshold value.

11. The air pressure detection device for a tire as set forth in claim 10, and further including a threshold value storage means for storing a plurality of threshold values commensurate with a plurality of distinct tires and tire conditions.

12. The air pressure detection device for a tire as set forth in claim 11, wherein the means for calculating a reduced/increased air pressure, the threshold value storage means, the comparing means and the alarm signal generating means form a control unit for receiving air pressure and temperature from a tire.

* * * * *